US011729387B1

(12) United States Patent
Khsib et al.

(10) Patent No.: US 11,729,387 B1
(45) Date of Patent: Aug. 15, 2023

(54) AUTOMATIC CONFIGURATION OF SETTINGS FOR A VIDEO ENCODER

(71) Applicant: Amazon Technologies, Inc., Seattle, WA (US)

(72) Inventors: Ramzi Khsib, Coquitlam (CA); Istvan Fehervari, North Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 17/111,292

(22) Filed: Dec. 3, 2020

(51) Int. Cl.
*H04N 19/124* (2014.01)
*H04N 19/61* (2014.01)
*H04N 19/172* (2014.01)
*H04N 19/176* (2014.01)

(52) U.S. Cl.
CPC ......... *H04N 19/124* (2014.11); *H04N 19/172* (2014.11); *H04N 19/176* (2014.11); *H04N 19/61* (2014.11)

(58) Field of Classification Search
CPC .. H04N 19/172; H04N 19/176; H04N 19/124; H04N 19/61
See application file for complete search history.

(56) References Cited

U.S. PATENT DOCUMENTS

| | | | | |
|---|---|---|---|---|
| 11,582,442 | B1 * | 2/2023 | Fehervari | H04N 19/136 |
| 2011/0249086 | A1 * | 10/2011 | Guo | H04N 23/80 |
| | | | | 348/E7.083 |
| 2019/0132591 | A1 * | 5/2019 | Zhang | H04N 19/59 |
| 2020/0145660 | A1 * | 5/2020 | Cremon | H04N 19/85 |
| 2020/0267396 | A1 * | 8/2020 | Zhang | H04N 19/154 |
| 2020/0314437 | A1 * | 10/2020 | Smole | G06N 20/00 |

(Continued)

OTHER PUBLICATIONS

Bitmovin, "Adaptive Streaming", available online at <https://bitmovin.com/adaptive-streaming/>, 2021, 10 pages.

(Continued)

*Primary Examiner* — Jessica M Prince
(74) *Attorney, Agent, or Firm* — Nicholson De Vos Webster & Elliott LLP

(57) ABSTRACT

Techniques for automatically configuring settings for a video encoder are described. According to some embodiments, a computer-implemented method includes setting a content delivery service to an automatic video encoder configuration mode, determining statistics for a plurality of frames of a live video, concurrently generating a first spatial adaptive quantization strength value for a first quantization parameter value by a first machine learning model for an input comprising the statistics, and a second spatial adaptive quantization strength value for a second, different quantization parameter value by a second machine learning model for an input comprising the statistics, receiving a quantization parameter value from a rate controller of the content delivery service, encoding the live video at the first spatial adaptive quantization strength value when the quantization parameter value from the rate controller is the first quantization parameter value, encoding the live video at the second spatial adaptive quantization strength value when the quantization parameter value from the rate controller is the second, different quantization parameter value, and transmitting the encoded live video to a viewer device.

17 Claims, 13 Drawing Sheets

(56) References Cited

U.S. PATENT DOCUMENTS

2022/0053195 A1* 2/2022 Hurwitz ............. G06V 10/7788
2023/0072186 A1* 3/2023 Yamagishi ......... H04N 21/2662

OTHER PUBLICATIONS

CDVL, "The Consumer Digital Video Library", Retrieved on Apr. 13, 2021, 1 page.

Fogg et al., "ISO/IEC Software Implementation of MPEG-1 Video", Proceedings Of SPIE, vol. 2187, May 1994, 10 pages.

Ittiam, "THINKode _ ML based Content Adaptive Encoding", Ittiam Systems, available online at <https://www.ittiam.com/product/thinkode/>, 2018, 7 pages.

ITU—Telecommunications Standardization Sector, "Improvements of the BD-PSNR Model", Video Coding Experts Group (VCEG), Jul. 16-18, 2008, 3 Pages.

ITU-T, "Subjective video quality assessment methods for multimedia applications", Series P: Telephone Transmission Quality, Telephone Installations, Local Line Networks, Audiovisual Quality in Multimedia Services, Recommendation ITU-T P.910, Apr. 2008, 42 pages.

Joshi et al., "Review of Standard Traditional Distortion Metrics and a need for Perceptual Distortion Metric at a (Sub) Macroblock Level", Middlesex University Research Repository, Jun. 2013, 7 pages.

Mewiki, "X264 Settings", Feb. 7, 2011, 32 pages.

Netflix, "Per-Title Encode Optimization", available online at <https://netflixtechblog.com/per-title-encode-optimization-7e99442b62a2>, Dec. 14, 2015, 13 pages.

Netflix, "VMAF: The Journey Continues", available online at <https://netflixtechblog.com/vmaf-the-journey-continues-44b51ee9ed12>, Oct. 25, 2018, 12 pages.

Netflix/vmaf, "vmaf/NFLX_dataset_public.py", Available Online at <https://github.com/Netflix/vmaf/blob/master/resource/dataset/NFLX_dataset_public.py>, Retrieved on Jul. 1, 2021, 10 pages.

Pakdaman et al., "Complexity Analysis of Next-Generation VVC Encoding and Decoding", IEEE International Conference on Image Processing (ICIP), 2020, 6 pages.

Pinson et al., "A New Subjective Audiovisual & Video Quality Testing Recommendation", VQEG eLetter, vol. 1, No. 2, Dec. 2014, 10 pages.

Shoham, Tamar et al., "A Deep Dive into CABR, Beamr's Content-Adaptive Rate Control", Sep. 11, 2019, 9 pages.

Sullivan et al., "Rate-Distortion Optimization for Video Compression", IEEE, Nov. 1998, pp. 74-90.

USC Media Communications Lab, "MCL-JCV Dataset", 2013, available online at <http://mcl.usc.edu/mcl-jcv-dataset/>, 3 pages.

Wei et al., "Learning and Using the Arrow of Time", 2018, 9 pages.

Youtube Engineering and Developers Blog, "Making High Quality Video Efficient", Apr. 24, 2018, 8 pages.

Zvezdakova et al., "BSQ-Rate: A New Approach for Video-Codec Performance Comparison and Drawbacks of Current Solutions", Proceedings of the Institute for System Programming of RAS, Jan. 2020, 11 pages.

\* cited by examiner

AUTOMATIC CONFIGURATION OF SETTINGS FOR A VIDEO ENCODER

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

Figure 1:
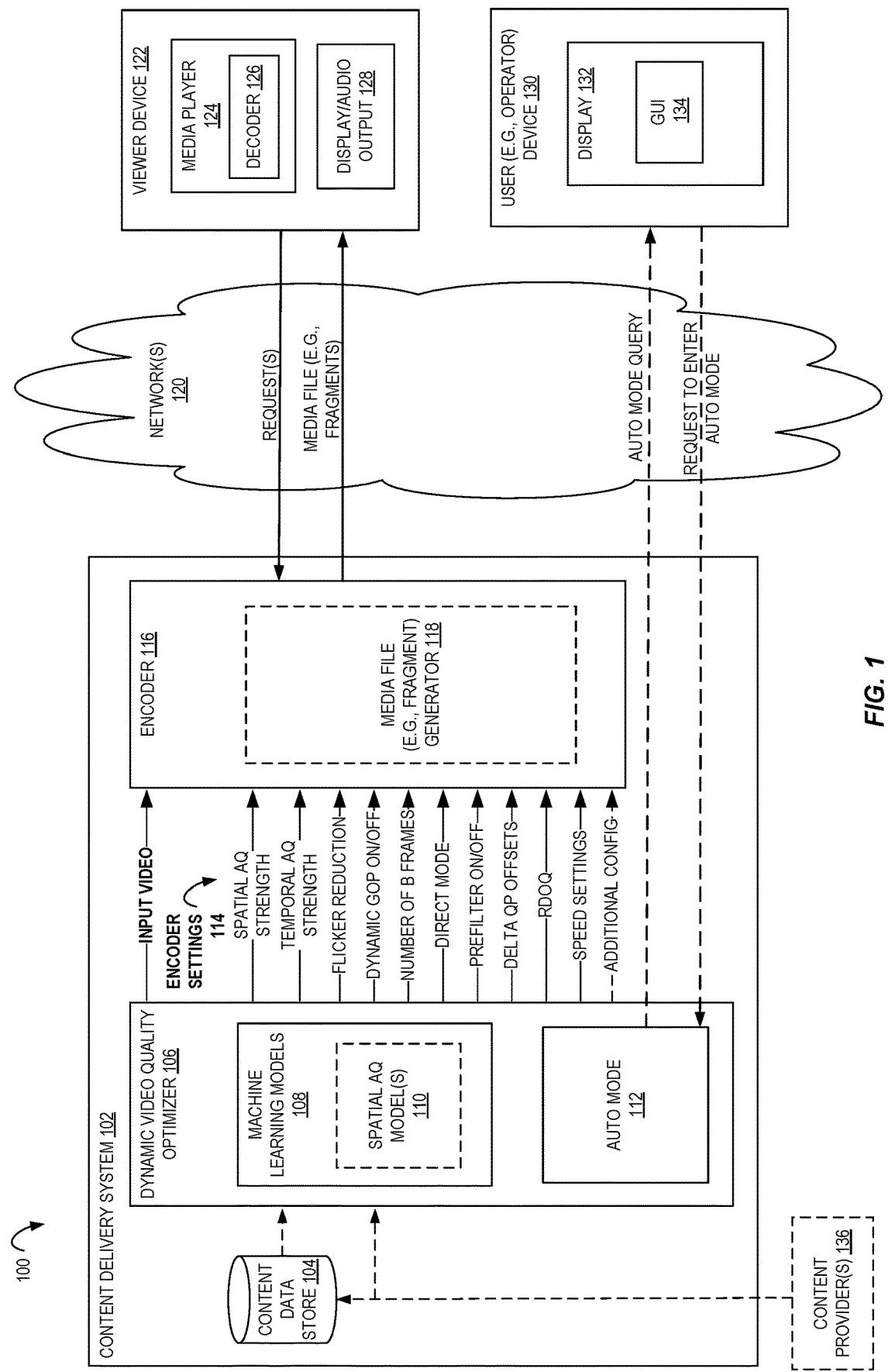
FIG. 1 is a diagram illustrating an environment including a content delivery system having a dynamic video quality optimizer to generate one or more encoding settings, and an encoder to encode a media file according to the one or more encoding settings and send the encoded media file to a viewer device according to some embodiments.

The present disclosure relates to methods, apparatus, systems, and non-transitory computer-readable storage media for the automatic configuration of settings for a video encoder. In certain embodiments, a video compression objective is to find the optimal balance between compression efficiency and perceptual quality for a wide variety of content (e.g., including live video). One of the challenges of this optimal balance is finding the optimal encoder settings (e.g., parameters) where different content (e.g., a live sporting event versus a live news cast) requires different settings. Another challenge is where the encoder settings are to adapt locally to the content, for example, where the settings are to dynamically change on scene, group of picture (GOP), and/or frame granularities. Embodiments herein use machine learning models to dynamically infer an optimal encoder setting(s), e.g., in contrast to determining encoder setting(s) by encoder heuristic(s), tuned preset(s), or best practices guide(s). When encoding a live video (e.g., into an encoded stream for live (or perceptibly live) presentation), embodiments herein allow for a (e.g., real time) single encoding with inferred encoder setting(s) in contrast to encoding multiple times with different encoder settings in a "trial and error" process, e.g., according to encoder setting(s) by encoder heuristic(s), tuned preset(s), or best practices guide(s). Certain embodiments herein operate in a non-iterative way with an adaptation granularity (e.g., ranging from a scene to a frame (e.g., picture)) to achieve an optimal trade-off between perceived quality and compression efficiency (e.g., computational complexity).

More particularly, video compression has been an active area of research for about the last 30 years. The fundamentals of video encoding have not change drastically over the years. As an example, an end user may be tasked with deciding on a target bitrate and a Group of Picture (GOP) structure with periodic intra-frames (I-frames), among other encoder settings. As certain content (e.g., live video versus video-on-demand) is different, it may need to be encoded differently. Selecting the wrong encoder settings may lead to waste of bandwidth between the content delivery service and a viewer device and/or objectionable video quality degradation. Thus, encoder settings may be selected adaptivity through heuristics, e.g., with the user selecting predefined tuning sets prior to encoding. The encoder may thus be adapted to the particular content, e.g., modeling the bitrate ladder in the Adaptive BitRate (ABR) stack for streaming applications. However, such content adaptive solutions may be applicable only to video-on-demand (VoD) and bitrate allocation. Embodiments herein optimize video encoders settings based on content characteristics for both VoD and (e.g., real time) live broadcast. Certain embodiments herein utilize one or more machine learning models to dynamically select the optimal encoder setting(s) adaptive to the (e.g., changing) input content. In one embodiment, the machine learning model(s) use offline training and video quality optimization to infer optimal video encoder settings from quality perspective. Embodiments herein thus provide a dynamic video quality optimizer that is robust, fail-safe against catastrophic failures, generalizable, and/or fast. Embodiments herein utilize one or more machine learning models to select the optimal encoder setting(s) for real time live video transcoding applications.

FIG. 1 is a diagram illustrating an environment 100 including a content delivery system 102 having a dynamic video quality optimizer 106 to generate one or more encoding settings 114, and an encoder 116 to encode a media file (e.g., "input video") according to the one or more encoding settings and send the encoded media file to a viewer device 122 according to some embodiments. In certain embodiments, video compression (e.g., of a content delivery system/service) includes a set of adjustable video configuration settings, e.g., encoder settings 114 in FIG. 1. In certain embodiments, at the start of the video encoding process the user (e.g., operator) is to make informed decision on these settings for the most crucial settings and revert to default values for the rest of the settings. The decision on these settings may require a high level of user expertise. Although the default values may constitute a reasonable trade-off for certain content/uses, in numerous situations, the default values are not capable of delivering the optimal quality. Embodiments herein utilize one of more machine learning models 108 to adapt the (video) encoder settings 114 to content, e.g., especially the dynamic channels. For example, live broadcasts of a sport channels may contain segments of film trailers or computer-generated videos, and thus selecting a single tuning (e.g., single set of encoder settings) for "sports" may lead to non-optimal quality (e.g., for the film trailers or computer-generated videos) in these embodiments.

In certain embodiments, a dynamic video quality optimizer 106 (e.g., service and/or system) includes an automatic mode ("auto mode") 112, e.g., that automatically determines with a defined granularity one or more of the quality driven optimal encoder settings 114. In one embodiment, storing a first value into field for auto mode 112 causes the dynamic video quality optimizer 106 to determine the one or more encoder settings 114, e.g., and storing a second, different value into field for auto mode 112 causes the dynamic video quality optimizer 106 to not determine the one or more encoder settings. As content delivery system 102 may be utilized for live (e.g., and video-on-demand) application, the computation overhead of the dynamic video quality optimizer 106 is to be limited compared to the computation used by the entire encoding pipeline (e.g., encoder 116) to make it usable by a user (e.g., end user) in certain embodiments.

Embodiments herein of a dynamic video quality optimizer provide optimal perceptual quality, adapt to a dynamically changing content, are capable of running live, are scalable, are failsafe, and/or are robust. Embodiments herein utilize machine learning to build a content adaptive encoder. Certain embodiments herein utilize deep neural networks. Other embodiments herein instead use (e.g., for real-time video encoding) an ensemble of machine learning (e.g., classic) models, e.g., models that operate with a higher bias, a lower variance, are lightweight, scalable, and are less prone to overfitting.

The depicted content delivery system 102 includes a content data store 104, which may be implemented in one or more data centers. In one embodiment, the media file (e.g., video file that is to be viewed by the viewer device 122) is accessed (for example, from the content data store 104 or directly from a content provider 136, e.g., as a live stream) by encoder 116 (e.g., by media file (e.g., fragment) generator 118). In certain embodiments, the (e.g., client) viewer device 122 requesting the media file (e.g., fragment(s) of media) from content delivery system 102 causes the encoder 116 to encode the video file, e.g., into a compressed format for transmittal on network(s) 120 to viewer device 122. In one embodiment, the media file generator 118 generates one or more subsets (e.g., frames, fragments, segments, scenes, etc.) of the media file (e.g., video), e.g., beginning with accessing the media file and generating the requested media (e.g., fragment(s)). In one embodiment, each fragment includes a plurality of video frames.

It may be desirable to allow dynamic video quality optimizer 106 to generate one or more encoder settings 114, e.g., without user device 130 or viewer device 122 inputting those one or more encoder settings 114. Content delivery system 102 includes dynamic video quality optimizer 106. Depicted dynamic video quality optimizer 106 uses one or more machine learning models 108 to infer (e.g., optimal) encoder settings 114 for input video (e.g., from dotted path on the left of FIG. 1). Training and use of the machine learning model(s) 108 are discussed further below, e.g., in reference to FIGS. 2-7.

In FIG. 1, content delivery system 102 is coupled to viewer device 122 and user device 130 via one or more networks 120, e.g., a cellular data network or a wired or wireless local area network (WLAN).

In certain embodiments, content delivery system 102 (e.g., dynamic video quality optimizer 106 thereof) is to send a query (e.g., asking if auto mode is desired) to user (e.g., operator) device 130, for example, and the user device 130 (e.g., in response to a command from a user of the device 130) is to send a response (e.g., an indication to enter or not enter auto mode 112). Depicted user device 130 includes a display 132 having a graphical user interface (GUI) 134, e.g., to display a query for dynamic video quality optimizer 106 to enter (or not) auto mode 112.

Depicted viewer device 122 (e.g., where the viewer is a customer of user (e.g., operator) of device 130) includes a media player 124 having a decoder 126 to decode the media file (e.g., fragment) from the content delivery system 102, e.g., to display video and/or audio of the media file on display and/or audio output 128, respectively.

In certain embodiments, dynamic video quality optimizer 106 in auto mode 112 uses machine learning model(s) 108 (and/or is a machine learning powered service) that automatically determines one or more of the encoder settings 114. For example, with one or more a spatial adaptive quantization machine learning models 110 for determining a spatial adaptive quantization strength value of the encoder settings 114 that control the encoding process by encoder 116. Encoding may compress a video file into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and both the preceding and following frames to specify its content). For example, with P-frames and B-frames being inter-coded pictures. In one embodiment, each single I-frame includes a plurality of inter-coded frames (e.g., P-frames and/or B-frames), e.g., as a group of pictures (GOP).

Encoder settings 114 may include values setting one, all, or any combination of the following: spatial adaptive quantization strength, temporal adaptive quantization strength, flicker reduction, dynamic group-of-pictures (GOP) on/off, number of B-frames (e.g., per GOP), direct mode (e.g., allowing B-frames to use predicted motion vectors instead of actual coding of each frame's motion) (e.g., for a scene), prefilter on/off, delta quantization parameter (QP) offsets (e.g., between I-frame and P-frames/B-frames), rate distortion optimization quantization (RDOQ), speed settings, or additional configuration (e.g., encoder) settings.

In certain embodiments, the quantization parameter (QP) is a value that sets the amount of compression for every block (e.g., macroblock) in a frame, for example, with a large QP value indicating that there will be higher quantization, and thus more compression and lower quality, and a lower QP value indicating the opposite. In one embodiment, the possible QP values range from 0 to 51, e.g., according to a (e.g., H.264 or H.265) video encoding (e.g., compression) standard. In certain embodiments, the quantization parameter is determined by a rate controller (e.g., rate controller 222 in FIG. 2), for example, in response to the bandwidth available to transmit an encoded media (e.g., video) file to a viewer device (e.g., on network 120 in FIG. 1).

In certain embodiments, spatial adaptive quantization (AQ) strength is the amount of compression within a frame, e.g., where a more complex (e.g., based on spatial characteristics) proper subset (e.g., macroblock(s)) of a frame is provided more bits to encode more detail than the rest of the frame. In one embodiment, spatial AQ strength is within a range of 1 (e.g., least aggressive) to 15 (e.g., most aggressive). In certain embodiments, temporal adaptive quantization (AQ) strength is the amount of compression between frames, e.g., where a more complex (e.g., based on temporal characteristics) frame is provided more bits to encode more detail than another frame(s). In one embodiment, temporal AQ strength is within a range of 0 (e.g., disabled) to 1 (e.g., enabled).

In certain embodiments, the encoder settings 114 are divided into a plurality of categories, for example, (i) exposed to the user (e.g., via user device 130), e.g., any setting (e.g., configuration) that is exposed in a GUI of the product, (ii) internal commands, e.g., any setting (e.g., configuration) that is available in a command line, and/or (iii) previously static, e.g., but can be content dependent according to embodiments herein. In one embodiment, the (i) GUI exposed encoder setting(s) may include (e.g., spatial and/or temporal) AQ related settings and/or flicker reduction settings, (ii) internal (e.g., not exposed to GUI) command encoder setting(s) may include the number of B-frames, delta QP offset, and/or direct mode, and/or (iii) potential adjustable encoder setting(s) (e.g., any settings (e.g., parameters) that are currently/previously considered static but can be content dependent may include RDOQ adapted to content and/or speed setting feature where one or more of the features are turned on and/or off depending on the content.

In certain embodiments, the encoder setting(s) 114 generated by dynamic video quality optimizer 106 in auto mode 112 (e.g., uses machine learning model(s) 108 thereof) are provided to the encoder 116 and used to encode the input (e.g., live) video. The input video is shown as being provided from dynamic video quality optimizer 106, but it should be understood that the input video may be provided directly to encoder 116, for example, from (e.g., live) content provider 136.

Thus, embodiments herein provide for a machine learning model-driven perceptual video quality comparison. For example, given an encoder setting with N possible choices, certain embodiments herein assume there exists an optimal encoder configuration for a defined unit granularity. In one embodiment, optimality is defined as a joint quality/bitrate savings. Depending on the to be optimized setting, granularity can be a sequence, scene, Group of Pictures, sub-GOP, or even individual frames (e.g., pictures). The proposed dynamic video quality optimizer may include one or models for each encoder setting (e.g., those encoder settings available in user interface (e.g., GOP Size, number of B-frames, spatial AQ, temporal AQ, etc.). The discussion of FIGS. 2-3 below discusses particular examples with respect to spatial AQ, but it should be understood that these concepts generalizable to any other settings.

Figure 2:
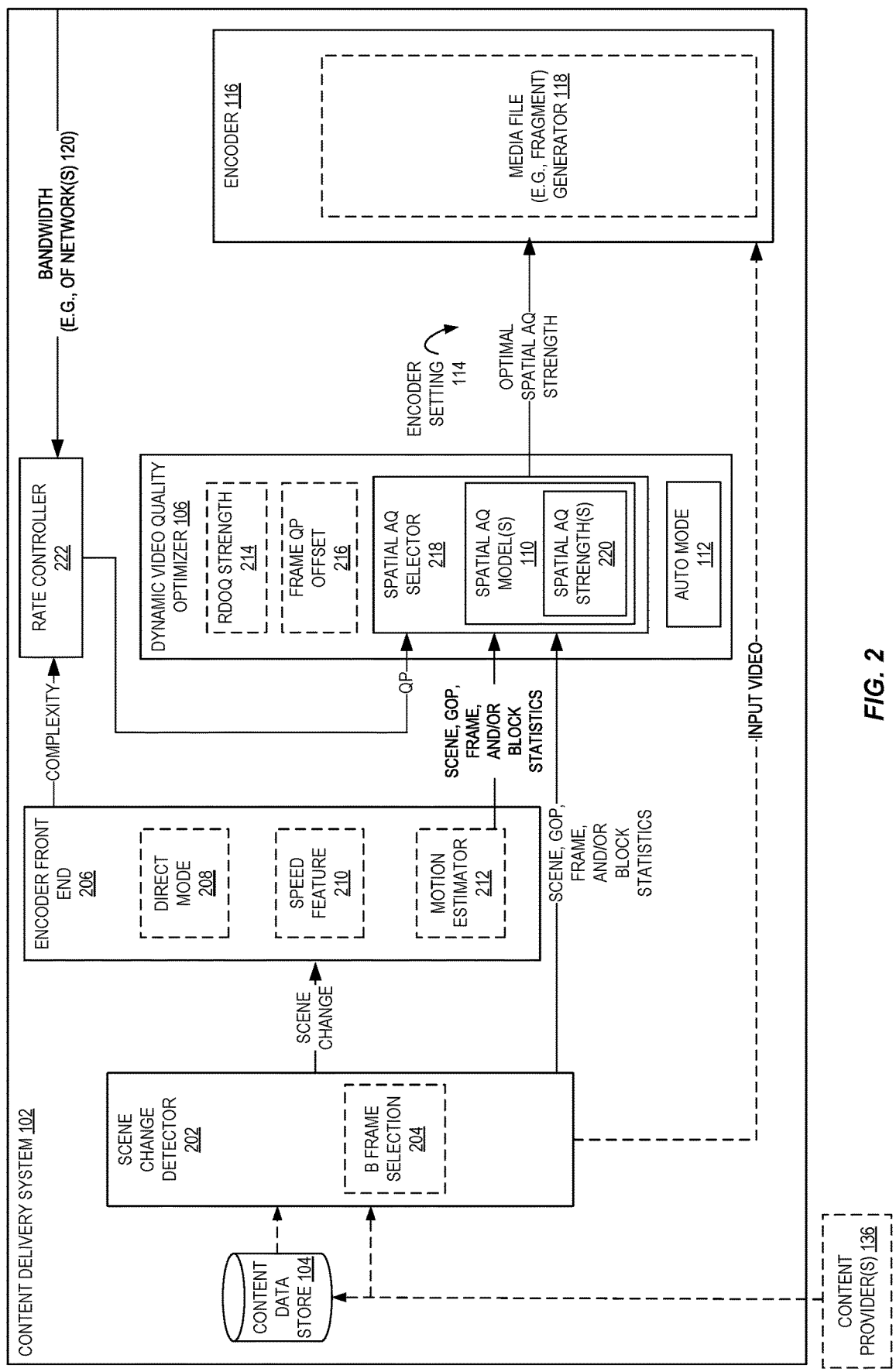
FIG. 2 is a diagram illustrating a content delivery system having a spatial adaptive quantization (AQ) selector to select an optimal spatial adaptive quantization strength value generated by one or more spatial adaptive quantization machine learning models according to some embodiments.

FIG. 2 is a diagram illustrating a content delivery system 102 having a spatial adaptive quantization (AQ) selector 218 to select an optimal spatial adaptive quantization strength value generated by one or more spatial adaptive quantization machine learning models 110 according to some embodiments.

In one embodiment, the selection of the optimal encoder settings (e.g., configurations) for an encoder is a manual task, e.g., where a visual quality guideline manual is used to recommend what configurations to be used to adapt to different customer content. Embodiments herein provide a dynamic video quality optimizer 106 (e.g., spatial adaptive quantization (AQ) selector 218) that adjusts automatically to customer content. In certain embodiments, dynamic video quality optimizer 106 utilizes one of more trained machine learning models to select one or more encoder settings based at least in part on the video content being received (e.g. in response to auto mode 112 being set). Embodiments herein thus simplify the user interface (e.g., GUI) of a content delivery system (e.g., by removing the manually selectable encoder settings) and/or reduce the risk that a user selects a wrong or non-optimal configuration. Embodiments herein optimize the encoded video quality and adapt to video content dynamically, e.g., where given a video (e.g., scene, GOP, etc.) there exists a globally optimal encoder setting that delivers the best quality. In certain embodiments, a dynamic video quality optimizer is to select the optimal encoder setting(s) (e.g., configuration(s)) from a plurality (e.g., all) of the possible configurations and pass the selected setting(s) to the encoder without visibility to the end user (e.g., viewer device 122 in FIG. 1). Certain embodiments herein integrate dynamic video quality optimizer 106 with encoder front end 206, e.g., as the pre-analysis stage of an encoding. Certain embodiments of a dynamic video quality optimizer 106 adapt the setting(s) on a per scene, per GOP, per frame, per block, etc., of granularity.

In FIG. 2, an input video is received, for example, from content data store 104 or directly from content provider(s) 136 (e.g., a live video) and routed to scene change detector 202, for example, to determine one or more statistics (e.g., at a scene, GOP, frame, and/or block granularity) (e.g., features). Additionally or alternatively, encoder front end 206 receives input video (e.g., and an indication of a scene change from scene change detector 202) and outputs one or more statistics (e.g., at a scene, GOP, frame, and/or block granularity) (e.g., features) (e.g., as determined by a motion estimator 212. In certain embodiments, encoder front end 206 outputs an indication of complexity to rate controller 222.

In certain embodiments, rate controller 222 receives an input of the available bandwidth (e.g., at a target bitrate) for transmitting the encoded video file, e.g., via network(s) 120 in FIG. 1. In certain embodiments, rate controller 222 outputs the quantization parameter (QP) that is to be used for that section (e.g., scene, GOP, frame, or block) of the input video, e.g., based on the complexity and/or bandwidth.

In certain embodiments, spatial AQ selector 218 is to receive the QP value, e.g., from the rate controller 222, and then select one of a plurality of possible spatial AQ strengths 220 output from one or more spatial AQ models, and outputs that one as the (e.g., optimal) spatial AQ strength value to be used as encoder setting 114 for encoding that section (e.g., scene, GOP, frame, or block) of the video. An example of this is discussed below in reference to FIG. 3. This may be repeated for each section (e.g., scene, GOP, frame, or block) of the video.

In certain embodiments, the content delivery system 102 performs a content analyzation (e.g., by scene change detector 202 and/or encoder front end 206 in FIG. 2) to generate content based statistics for input video and then determines (for example, by dynamic video quality optimizer 106, e.g., spatial AQ selector 218 thereof) which spatial AQ strength 220 is to be used from the set (e.g., a strength of 1-15, or a strength of: off, low, medium, high, higher, or maximum). In certain embodiments, dynamic video quality optimizer 106 adapts to the video (e.g., scenes, GOPs, frames, blocks, etc.) and dynamically changes the selection based on the statistics for the video. In one embodiment, for a GOP granularity, spatial AQ selector 218 is to select the optimally predicted spatial AQ strength from strengths 220 and use that for each frame in a plurality of frames of a GOP, e.g., and if the next GOP is in the same scene, smooth the spatial AQ strength.

Certain optional components are illustrated in FIG. 2, for example, as components of a dynamic video quality optimizer. In FIG. 2, a B-frame selector 204 may be included to select which frames of an input video are to be B-frames. A direct mode 208 may be included to allow, when set, B-frames to use predicted motion vectors instead of actual coding of each frame's motion. A speed feature 210 may be included to allow certain settings to be dependent on the speed. A rate distortion optimization quantization (RDOQ) strength 214 may be used to select the RDOQ strength used. A frame QP offset 216 may be used to select the frame QP offsets, e.g., between I-frame and P-frames/B-frames. Certain settings may include their own component, e.g., utilizing a respective machine learning model. For example, a separate component (e.g., and model) for AQ selection (e.g., spatial AQ selector 218), GOP structure selection, frame QP offset selection, and direct mode selection. In one embodiment, AQ selector adapts on a GOP level of granularity while direct mode selector operates on B-frames only. The timing inside a content delivery system/service (e.g., an encoder pipeline thereof) may include that an AQ selector (e.g., spatial AQ selector 218) is dependent on (e.g., frame) QP such that AQ selector is downstream of rate controller 222, direct mode 208 selection operates in conjunction with temporal AQ occurring inside the encoder front end 206, and/or B-frame selection 204 happens before frame reorder. Prediction mechanism of dynamic video quality optimizer 106 may utilize advanced prediction for certain settings and purely threshold based/statistics based for other settings. In a phased approach, each component is designed, trained, and/or implemented separately. However, some components may be combined into a single component (e.g., module), e.g. a single spatial and temporal AQ component due to their intrinsic interaction a component that predicts simultaneously both settings.

In one embodiment, a training objective of a video quality optimization model (e.g., spatial AQ model 110) is to select the optimal encoder setting for a particular sequence, scene, GOP, or frame. One objective of this optimization may be to minimize coded bitrate (often referred to as the bandwidth) and maximize perceptual quality (e.g., video quality. Rate Distortion Optimization (RDO) may be used in an encoder mode decision stage to model a joint optimization of bitrate R and quality D using the following:

$$J = D + \lambda R \quad (1)$$

In one embodiment, an RDO algorithm attempts to find a mode from N possible modes that minimizes the joint cost J or RDO cost with the trade-off between rate and distortion controlled by the Lagrange multiplier $\lambda$. In another embodiment, the Bjøntegaard BD-Rate model attempts to find the mode by a nonparametric method that will incorporate the joint optimization of rate/distortion (resp. bitrate/quality), e.g., to estimate the average bitrate reduction of one compression algorithm over another according to a selecting objective metric. The objective metric may be the peak signal-to-noise ratio, structural similarity index measure (SSIM), Video Multimethod Assessment Fusion (VMAF), etc., e.g., any objective metric that supports the triangle equality rule. In certain embodiments, the BD-Rate method is applied to provide the targets for optimal encoder settings. For example, by (1) picking an encoder setting from the list of all possible settings, (2) for each possible quantization parameter (e.g., 0 to 51), building rate distortion curves (as used by BD-Rate) using multiple (e.g., 4) points (e.g., 4 QPs around the selected QP), and (3) measuring the BD-Rate of the encoder setting vs. another (e.g., default) encoder setting(s). The granularity of the optimization may vary for each encoder setting to be optimized. For example, for adaptive quantization, the granularity may be set to sub-GOP size to enable adaptation to variation of the scene characteristics.

The selection of an objective quality metric (e.g., and keeping it below a threshold, such as threshold 522 in FIG. 5) for video comparison may be a major challenge for any video codec work. One drawback to objective quality metrics is the lack of correlation with the human perceived quality. The selection of objective metrics may be crucial in any video codec evaluation and/or optimization. In certain embodiments herein, VMAF may be biased towards sharper looking videos and SSIM (e.g., multiscale SSIM (MSSSIM)) may be robust to local blur that might be caused by adaptive quantization with bias towards structure rather than texture. However, there may be usable range for each metric, e.g. where VMAF discriminability diminishes at high values. Further, the ability to qualitatively judge a video varies from person to person with a large gap between experts and regular viewers, not to mention the effect of various viewing conditions. Embodiments herein combine full reference and nonreference objective quality in video encoder settings optimization, and depending on the bitrate range, the particular metrics used (e.g., alone or in combination) to get a better approximation of the human perceived quality. As an illustration, VMAF may fail in the presence of adaptive quantization, making it non-usable in the context of adaptive quantization.

In certain embodiments, the dynamic video quality optimizer 106 includes one or more machine learning models that are trained (e.g., offline) on a wide variety of content and scenarios.

Figure 3:
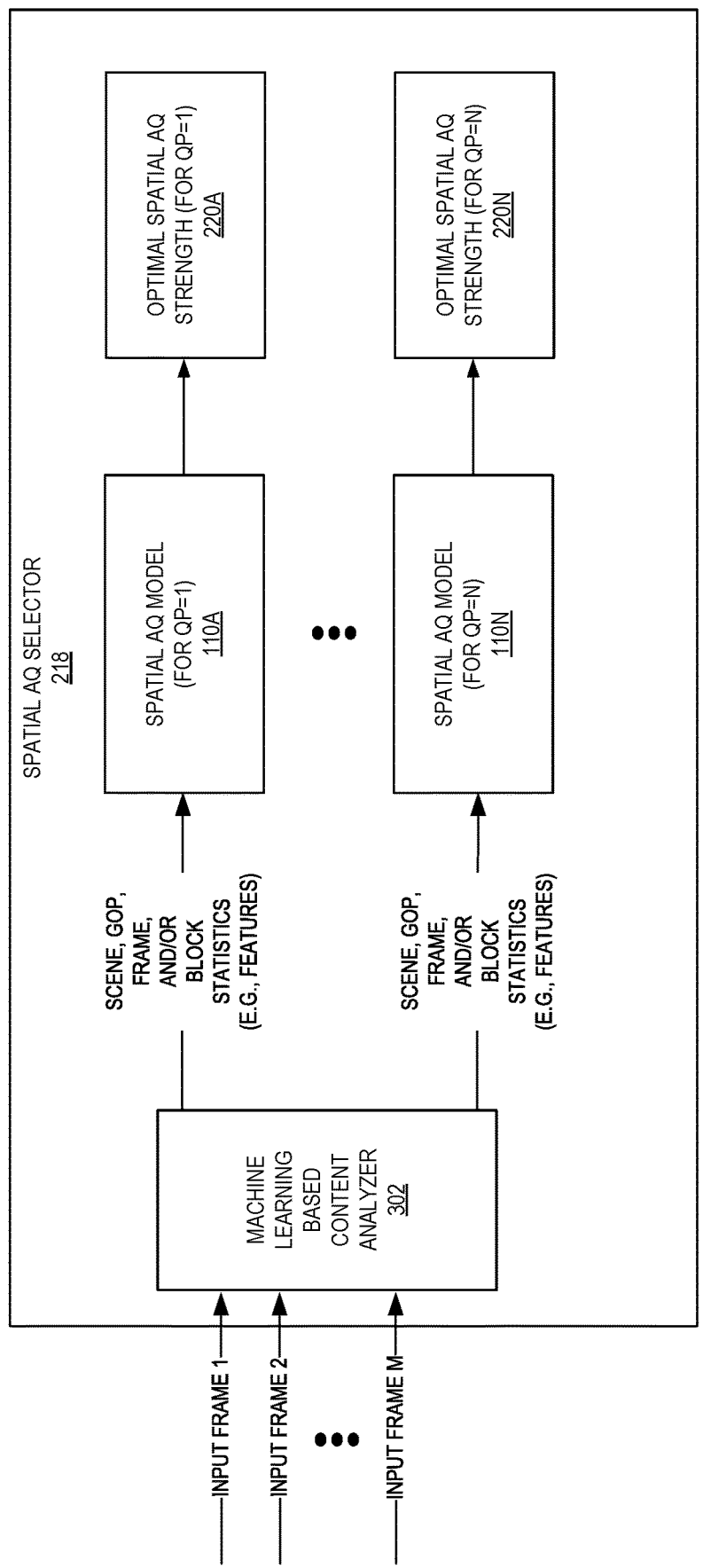
FIG. 3 is a diagram illustrating a spatial adaptive quantization selector comprising a plurality of optimal spatial adaptive quantization strength values from respective spatial adaptive quantization machine learning models for each of a plurality of different quantization parameter values according to some embodiments.

FIG. 3 is a diagram illustrating a spatial adaptive quantization selector 218 comprising a plurality of optimal spatial adaptive quantization strength values 220A-220N (where A-N may be 0-51 or any other number or range of numbers) from respective spatial adaptive quantization machine learning models 110A-110N for each of a plurality of different quantization parameter values (e.g., QP=1, 2, etc.) according to some embodiments. In FIG. 3, machine learning based content analyzer 302 is included to extract certain statistics (e.g., features) of each section of an input video (e.g., frames 1-M, where M is a positive integer greater than 1). For example, with the same statistics being broadcast to each of a plurality of spatial AQ models (110A-110N) in parallel and the spatial AQ models to output corresponding optimal spatial AQ strength values (220A-220N). Referring again to FIG. 2, in certain embodiments the spatial AQ selector receives a QP value (e.g., from rate controller 222) and selects the corresponding one of spatial AQ strength values (220A-220N), for example, if QP=1, then selecting the spatial AQ strength value 220A, e.g., and sending that to encoder 116 for use in encoding the corresponding section (e.g., frame) of the input video. This may be repeated for each section (e.g., scene, GOP, frame, or block) of the video. In certain embodiments, the content analyzer 302 (e.g., scene change detector 202 and/or encoder front end 206 in FIG. 2) extracts scene statistics and the spatial AQ selector 218 determines the optimal encoder setting(s) based on these statistics (e.g., extracted features).

The underlying machine learning framework may be bootstrapped aggregated trees (e.g., bagged trees) where the model is computationally low with reasonable accuracy, a feed forward neural network where the model is advanced with increased accuracy but increased computation.

Certain embodiments herein until the accumulated knowledge and content from customer content from a content service provider to train the one or more machine learning models. Certain embodiments herein are a failsafe design (e.g., for hard to predict cases) that allow a revert back mechanism, e.g., to revert from the inferred setting to a pre-selected (e.g., "safe") setting (e.g., that leads to reduced quality at worst). Certain embodiments herein use multiple metric optimization, for example, instead of using only one objective metric that creates a heavily optimized model towards one specific metric, e.g., such that an encoder that uses sum of squared error in its mode decision is intrinsically optimizing PSNR.

Figure 4:
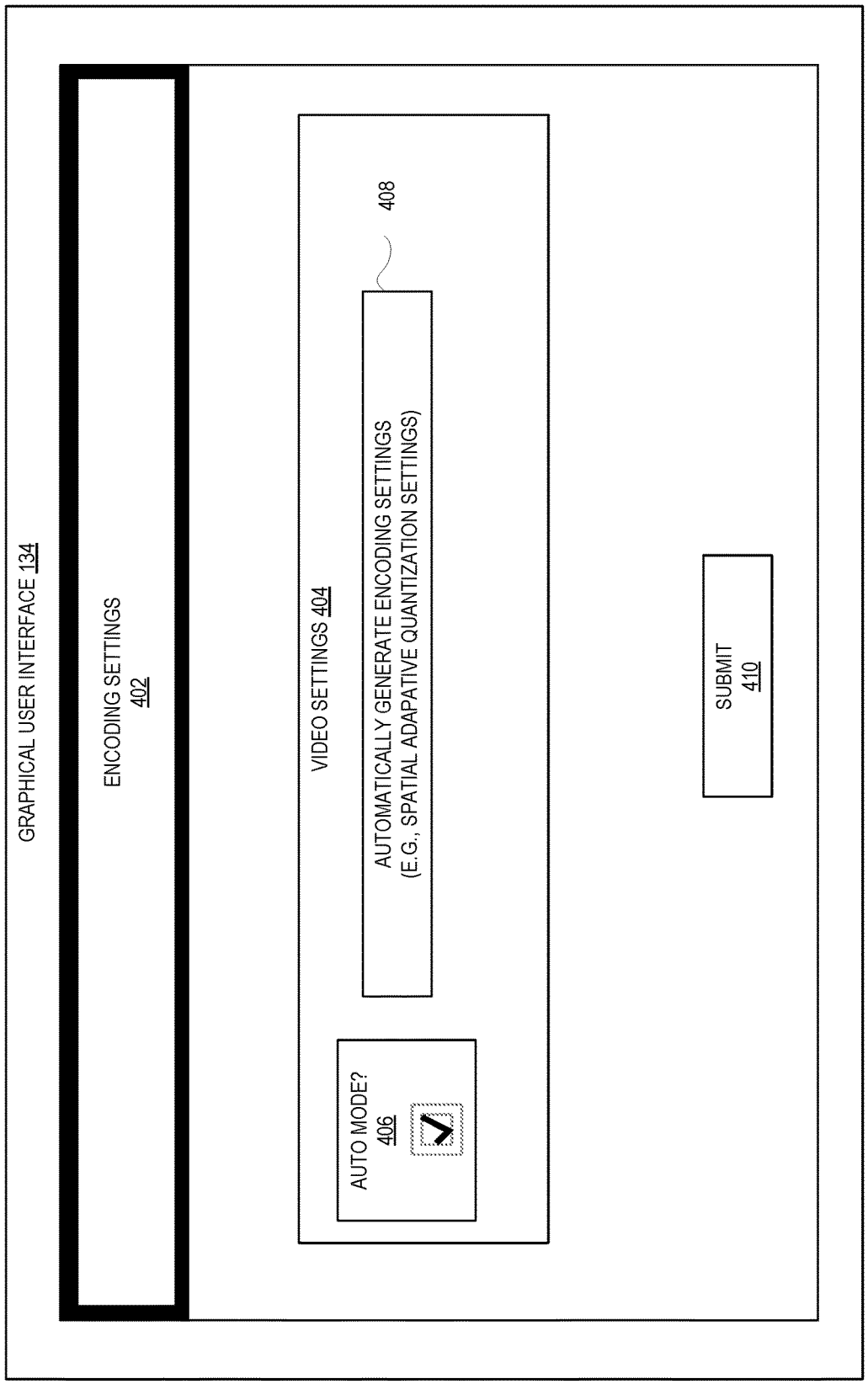
FIG. 4 is a diagram illustrating a graphical user interface for setting a content delivery system/service into an automatic video encoder configuration mode according to some embodiments.

FIG. 4 is a diagram illustrating a graphical user interface 134 for setting a content delivery system/service into an automatic video encoder configuration mode according to some embodiments. Depicted graphical user interface 134 includes a field 402 that is customizable with text to indicate that these are encoding settings, a field 404 that is customizable with text to indicate that these are encoding settings, an interface element 406 that, when selected, will cause the content delivery system/service to enter an automatic video encoder configuration mode, and a field 408 that is customizable with text to indicate that selecting the interface element 406 is to cause automatic generation of encoding setting(s) (e.g., spatial adaptive quantization setting(s)). A user may click the submit interface element 410 to (e.g., cause a command to be sent that causes) entry of a content delivery system/service into an automatic video encoder configuration mode (e.g., auto mode 112 in FIGS. 1, 2, and 5). An interface element, may include, but is not limited to, a thumbs up (or down), checkbox, button, dropdown menu, etc.

Figure 5:
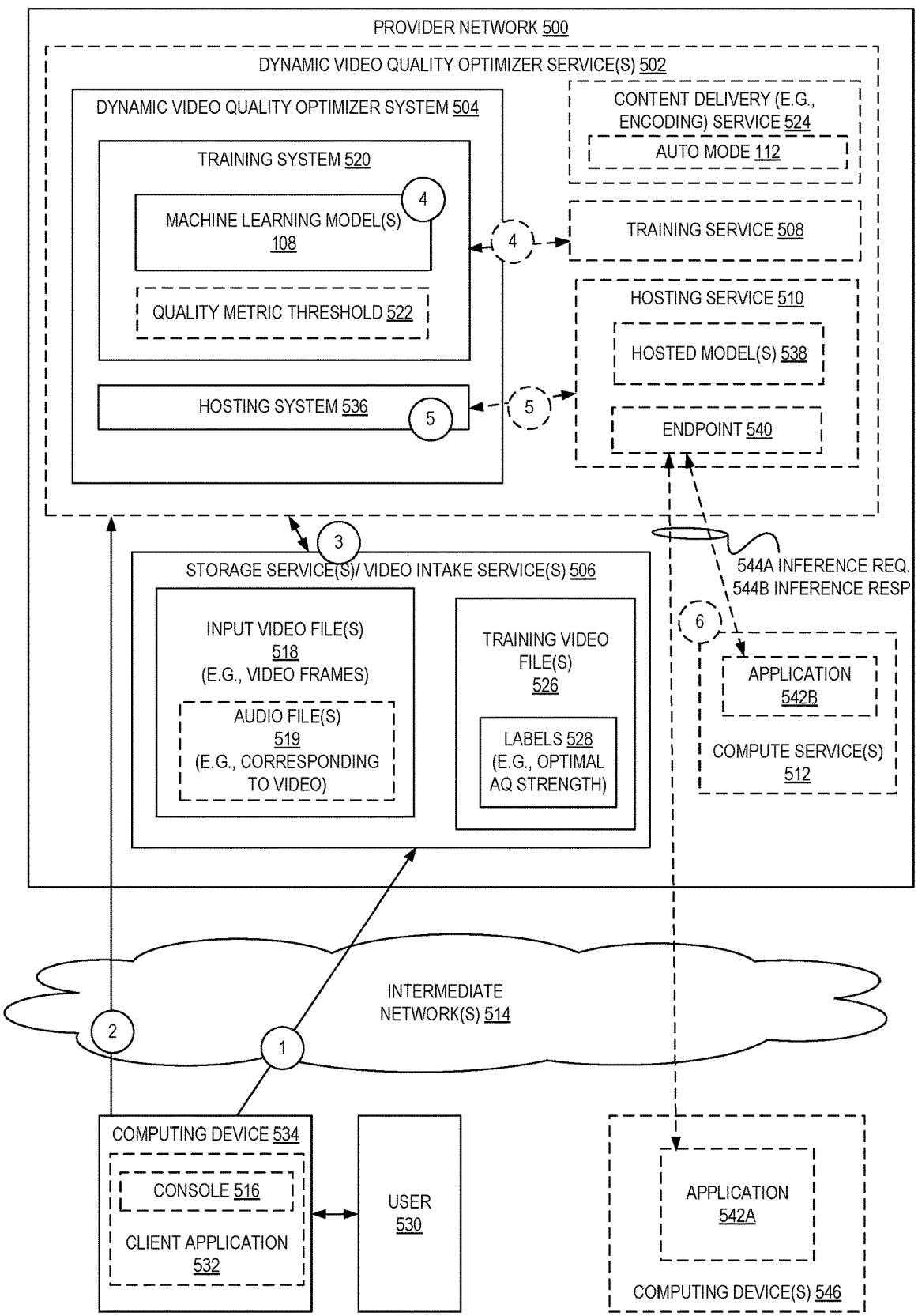
FIG. 5 is a diagram illustrating an environment for creating, training, and using models of a dynamic video quality optimizer service according to some embodiments.

FIG. 5 is a diagram illustrating an environment for creating, training, and using models of a dynamic video quality optimizer service 502 according to some embodiments. FIG. 5 includes a dynamic video quality optimizer system 504, one or more storage/video intake services 506, one or more training services 508, one or more hosting services 510, one or more compute services 512, and one or more content delivery services 524 implemented within a multi-tenant provider network 500. Each of the dynamic video quality optimizer service 502, one or more storage/video intake services 506, one or more training services 508, one or more hosting service 510, one or more compute services 512, and one or more content delivery services 524 may be implemented via software, hardware, or a combination of both, and may be implemented in a distributed manner using multiple different computing devices.

A provider network 500 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 512), a storage service 506 that can store data objects, etc. The users (or "customers") of provider networks 500 may utilize one or more user accounts that are associated with a customer account, though these terms may be used somewhat interchangeably depending upon the context of use. Users may interact with a provider network 500 across one or more intermediate networks 514 (e.g., the internet) via one or more interface(s), such as through use of application programming interface (API) calls, via a console 516 implemented as a website or application, etc. The interface(s) may be part of, or serve as a front-end to, a control plane of the provider network 500 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 500 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 500 by an on-demand code execution service (which may be one of compute service(s) 512) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 540B) that can be executed on demand, without requiring the user to maintain dedicated infrastructure to execute the serverless function. Instead, the serverless functions can be executed on demand using resources maintained by the provider network 500. In some embodiments, these resources may be maintained in a "ready" state (e.g., having a pre-initialized runtime environment configured to execute the serverless functions), allowing the serverless functions to be executed in near real-time.

The dynamic video quality optimizer service 502, in some embodiments, is a machine learning powered service that makes it easy for users to automatically configure settings for a video encoder. In some embodiments, dynamic video quality optimizer service 502—via use of training service 508—allows users to build and use models to perform tasks for automatic encoder setting configuration (e.g., on one or more input video file(s) 518 (and/or one or more (e.g., corresponding) audio file(s) 519)). In some embodiments, the dynamic video quality optimizer service 502 (e.g., training system 520) trains and uses one or more machine learning models 108.

The training system 520, for example, may enable users to generate machine learning models 108 that infers certain encoder settings from one or more input video file(s) 518 and/or one or more (e.g., corresponding) audio file(s) 519. In certain embodiments, the machine learning model 108 utilizes one or more components depicted in FIG. 3.

Embodiments herein allow a customer to create machine learning model 108 by supplying training video file(s) 526 (e.g., including labels 528 that indicate an optimal encoder setting (e.g., AQ strength) for certain sections).

At a high level, machine learning may include two major components that are required to be put in place in order to expose advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

Training may include using a hyperparameter optimization (HPO) pipeline to evaluate a plurality of models and respective configurations. Training may perform a grid search over the matrix of experiments (e.g., defined upfront) in search for the model and its parameters that performs best on the given dataset.

Thus, a user 530 may provide or otherwise identify a training dataset 526 with labels 528 (e.g., media (e.g., video) file and its corresponding optimal encoder setting labels) for use in creating a model. For example, as shown at circle (1), the user 530 may utilize a client application 532 executed by a computing device 534 (e.g., a web-application implementing a console 516 for the provider network 500, a standalone application, another web-application of another entity that utilizes the dynamic video quality optimizer service 502 as a part of its backend, a database or mixed-SQL environment, etc.) to cause the computing device 534 to upload the training dataset 526 with labels 528 to a storage location (e.g., provided by a storage service 506 such as an object storage service of a provider network 500).

Thereafter, at circle (2) the computing device 534 may issue one or more requests (e.g., API calls) to the dynamic video quality optimizer service 502 that indicate the user's 530 desire to train a machine learning model 108. The request may be of a type that identifies which type of model is to be created, e.g., CreateEncoderSettingModel for creating a machine learning model 108 that infers encoder setting(s). The request may also include one or more of an identifier of a storage location or locations storing the training dataset 526 (e.g., an identifier of just the video files, an identifier of just the labels 528, an identifier associated with both the video files and labels, etc.), which may identify a storage location (e.g., via a Uniform Resource Locator (URL), a bucket/folder identifier, etc.) within the provider network 500 (e.g., as offered by a storage service 506) or external to the provider network 500, a format identifier of the dataset 526, a language identifier of the language of the dataset 526, labels 528, etc.

Responsive to receipt of the request, the training system 520 of the dynamic video quality optimizer service 502 is invoked and begins operations for training the corresponding type of model.

In some embodiments, the training at circle (4) of the machine learning model 108 includes use (at optional, dotted circle (4)) of a separate training service 508 of dynamic video quality optimizer service 502; similarly, the hosting system 536 may make use (at optional, dotted circle (5)) of a hosting service 510 of a dynamic video quality optimizer service 502 to deploy a model as a hosted model 538 in association with an endpoint 540 that can receive search requests from client applications 542A and/or 542B at circle (6), provide the inference requests 544A to the associated hosted model(s) 538, and provide search results 544B (e.g., predicted encoder setting(s)) back to applications 542A and/or 542B, which may be executed by one or more computing devices 546 outside of the provider network 500 or by one or more computing devices of a compute service 512 (e.g., hardware virtualization service, serverless code execution service, etc.) within the provider network 500. In one embodiment, predicted encoder setting(s) are used by content delivery (e.g., encoding) service 524, e.g., when auto mode 112 is selected.

In certain embodiments, the training video files 526 cover various use cases of a broadcast: sports, movies, dark scenes, people talking (e.g., news broadcast), gaming content, etc. In certain embodiments, the input feature set (e.g., statistics) are based on pixel level statistical features, motion related features, and rate control driven features.

In certain embodiments, the machine learning model(s) 108 are random forest models, e.g., instead of a deep network model. Embodiments herein are directed to a perceptually-driven machine-learning based encoder that dynamically predicts optimal encoder settings on the fly (e.g., in real time), e.g., to deliver production-level quality without investing into extra computation power.

Figure 6:
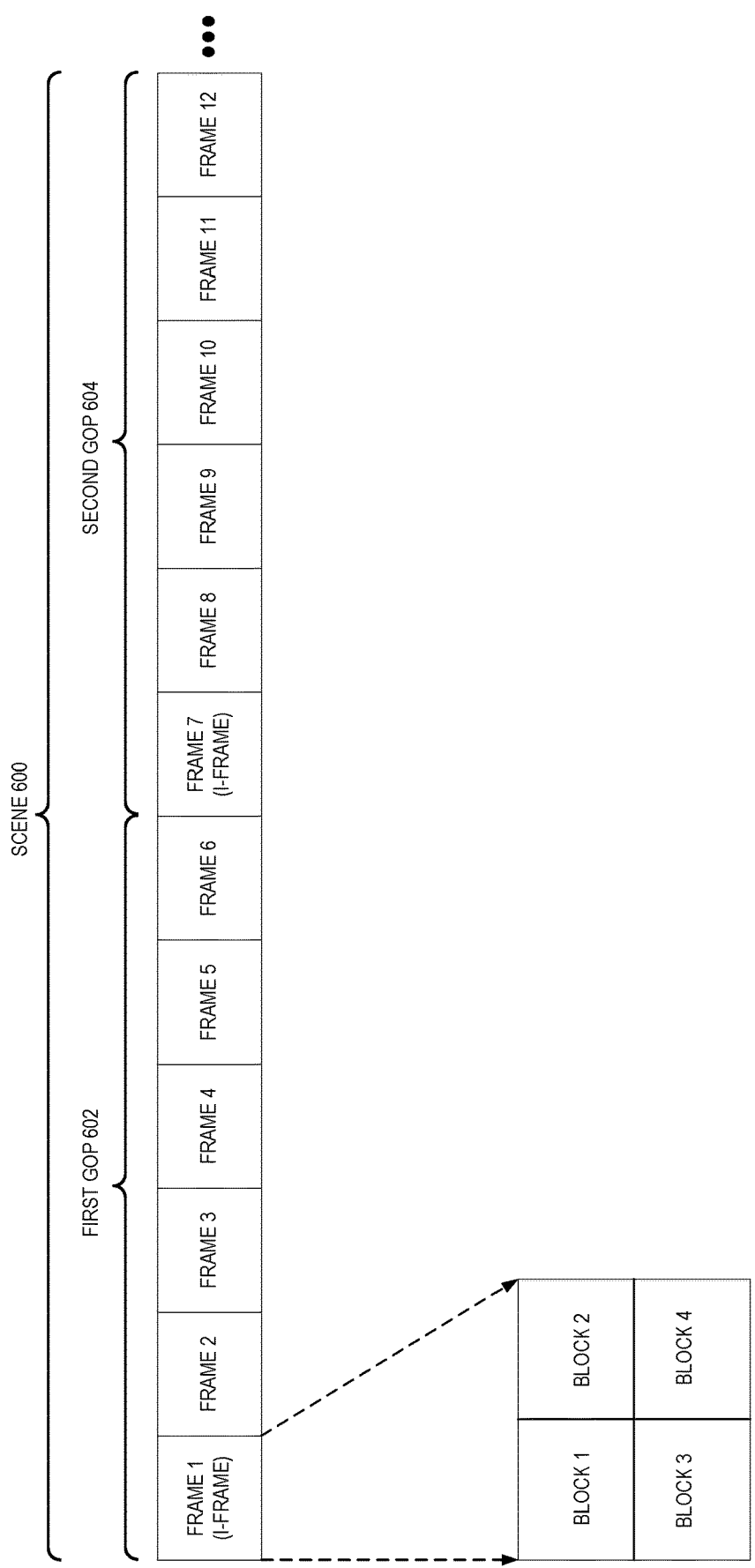
FIG. 6 is a diagram illustrating a scene having a plurality of groups of pictures, and a frame formed from a plurality of blocks (e.g., macroblocks) according to some embodiments.

FIG. 6 is a diagram illustrating a scene 600 having a plurality of groups of pictures 602, 604, and a frame (frame 1) formed from a plurality of blocks (blocks 1-4) (e.g., macroblocks) according to some embodiments. The number of scenes, GOPs (frames therein), and blocks are merely examples, e.g., it should be understood that any number of scenes, GOPs (frames therein), and blocks may be utilized.

Figure 7:
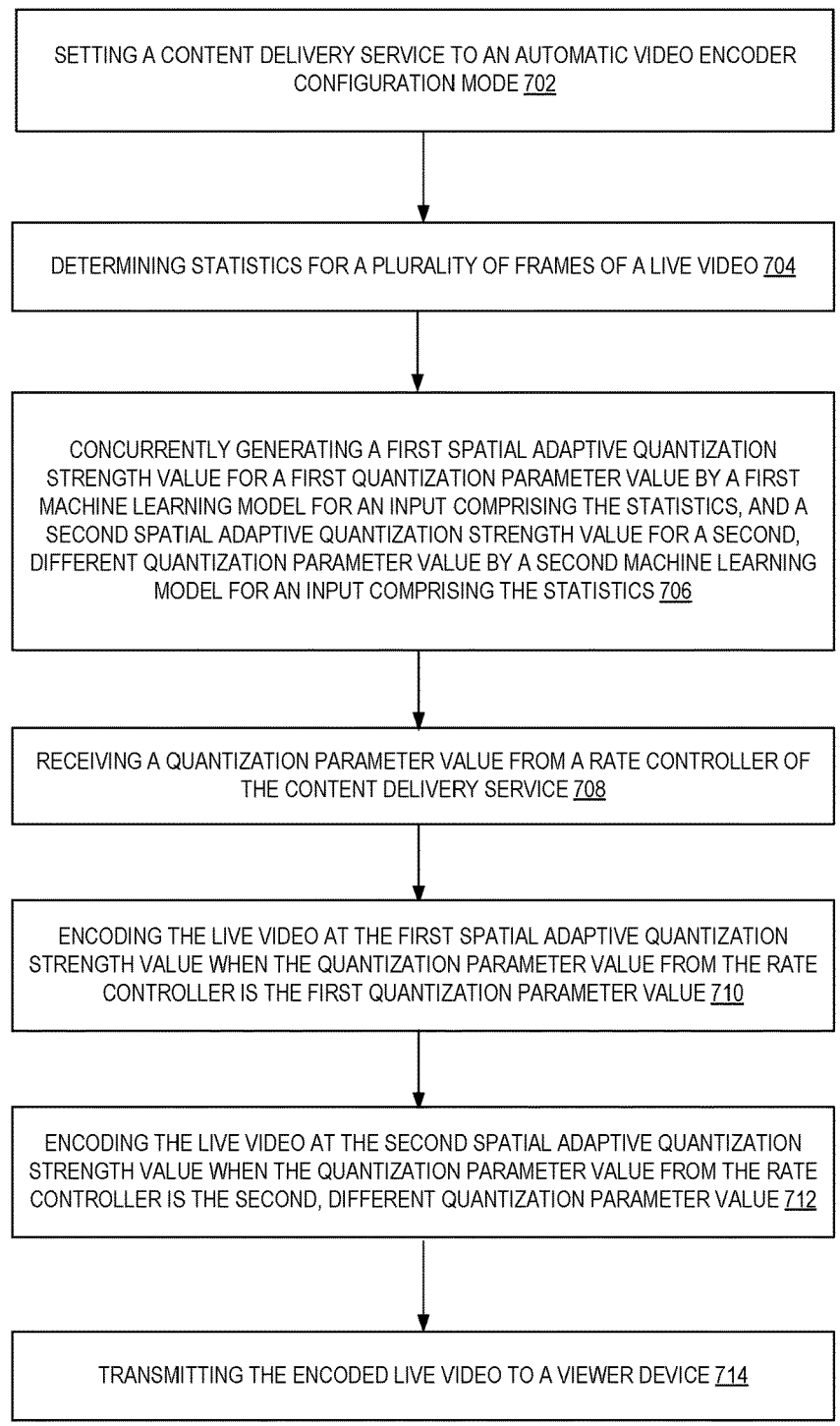
FIG. 7 is a flow diagram illustrating operations of a method for automatically generating and using a spatial adaptive quantization strength value in encoding a live video according to some embodiments.

FIG. 7 is a flow diagram illustrating operations 700 of a method for automatically generating and using a spatial adaptive quantization strength value in encoding a live video according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by content delivery system/service (or a component thereof) of the other figures.

The operations 700 include, at block 702, setting a content delivery service to an automatic video encoder configuration mode. The operations 700 further include, at block 704, determining statistics for a plurality of frames of a live video. The operations 700 further include, at block 706, concurrently generating a first spatial adaptive quantization strength value for a first quantization parameter value by a first machine learning model for an input comprising the statistics, and a second spatial adaptive quantization strength value for a second, different quantization parameter value by a second machine learning model for an input comprising the statistics. The operations 700 further include, at block 708, receiving a quantization parameter value from a rate controller of the content delivery service. The operations 700 further include, at block 710, encoding the live video at the first spatial adaptive quantization strength value when the quantization parameter value from the rate controller is the first quantization parameter value. The operations 700 further include, at block 712, encoding the live video at the second spatial adaptive quantization strength value when the quantization parameter value from the rate controller is the second, different quantization parameter value. The operations 700 further include, at block 714, transmitting the encoded live video to a viewer device.

Figure 8:
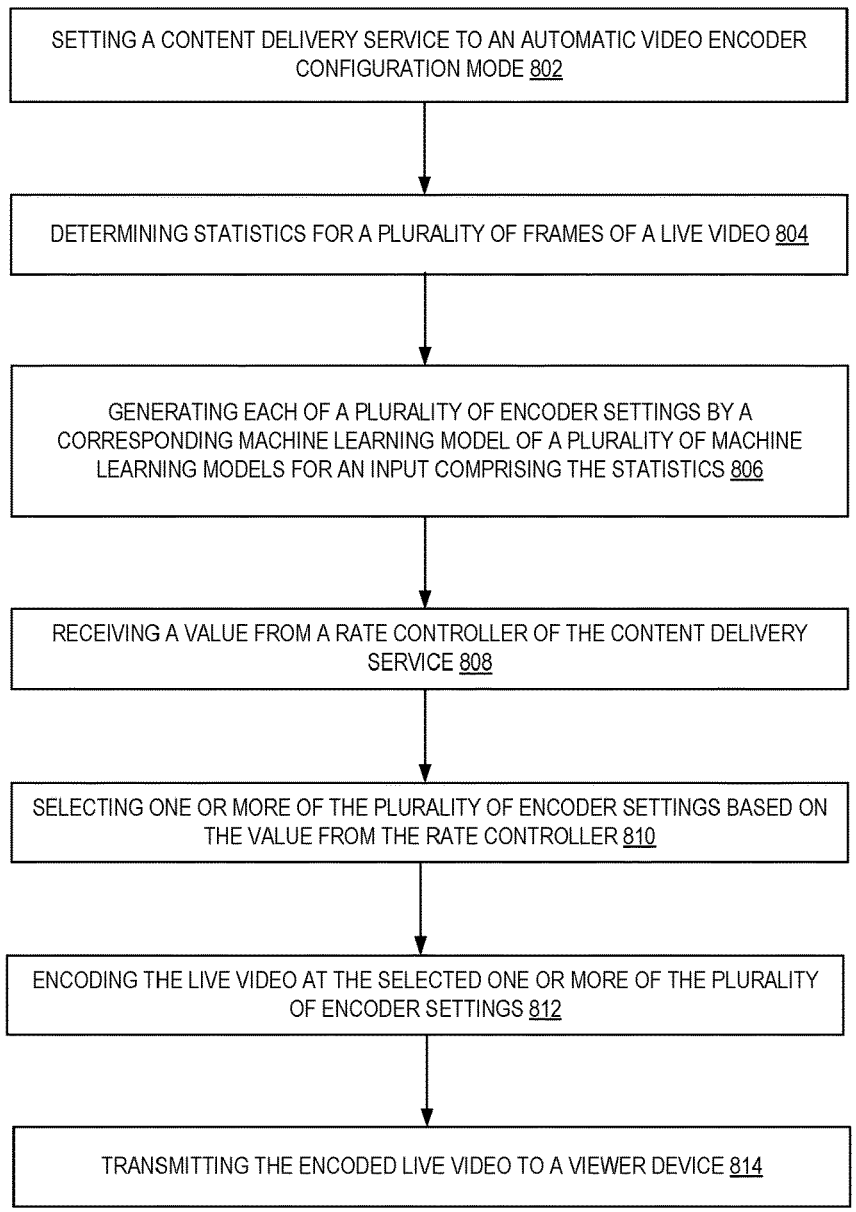
FIG. 8 is a flow diagram illustrating operations of a method for automatically generating and using one or more encoder settings in encoding a live video according to some embodiments.

FIG. 8 is a flow diagram illustrating operations 800 of a method for automatically generating and using one or more encoder settings in encoding a live video according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by content delivery system/service (or a component thereof) of the other figures.

The operations 800 include, at block 802, setting a content delivery service to an automatic video encoder configuration mode. The operations 800 further include, at block 804, determining statistics for a plurality of frames of a live video. The operations 800 further include, at block 806, generating each of a plurality of encoder settings by a corresponding machine learning model of a plurality of machine learning models for an input comprising the statistics. The operations 800 further include, at block 808, receiving a value (e.g., based on bandwidth) from a rate controller of the content delivery service. The operations 800 further include, at block 810, selecting one or more of the plurality of encoder settings based on the value from the rate controller. The operations 800 further include, at block 812, encoding the live video at the selected one or more of the plurality of encoder settings. The operations 800 further include, at block 814, transmitting the encoded live video to a viewer device.

Exemplary environments, systems, etc. that the above may be used in are detailed below.

Figure 9:
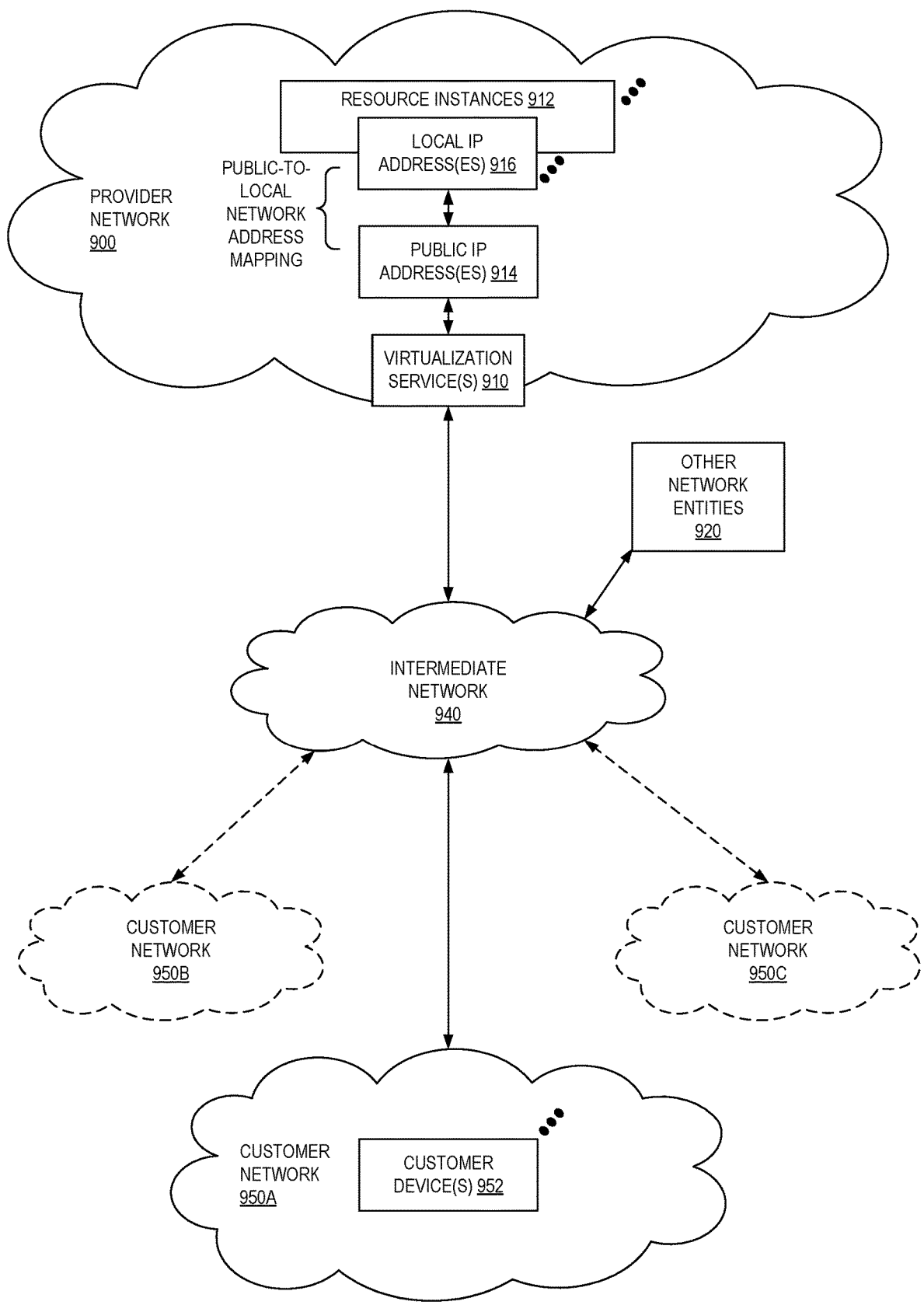
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
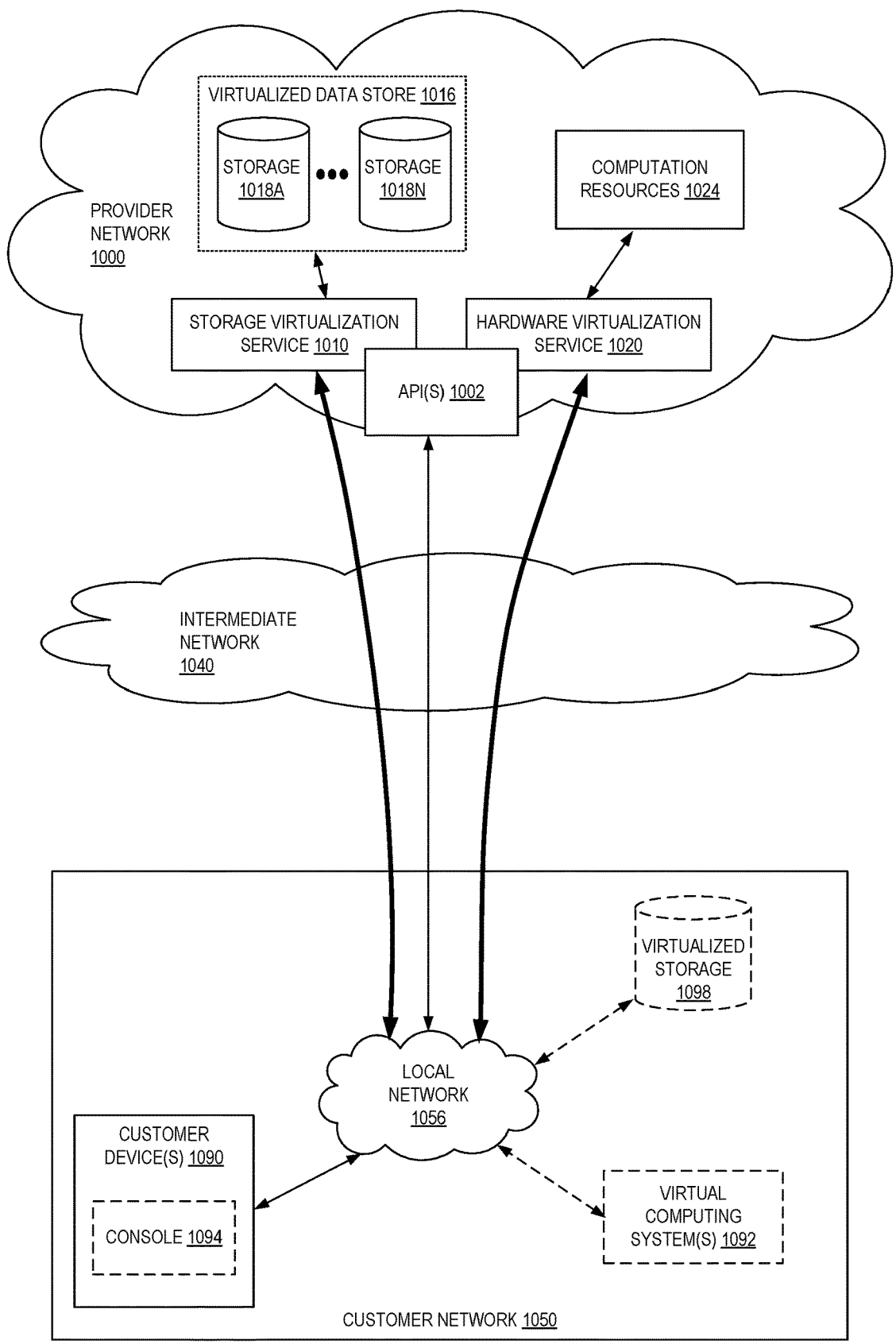
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
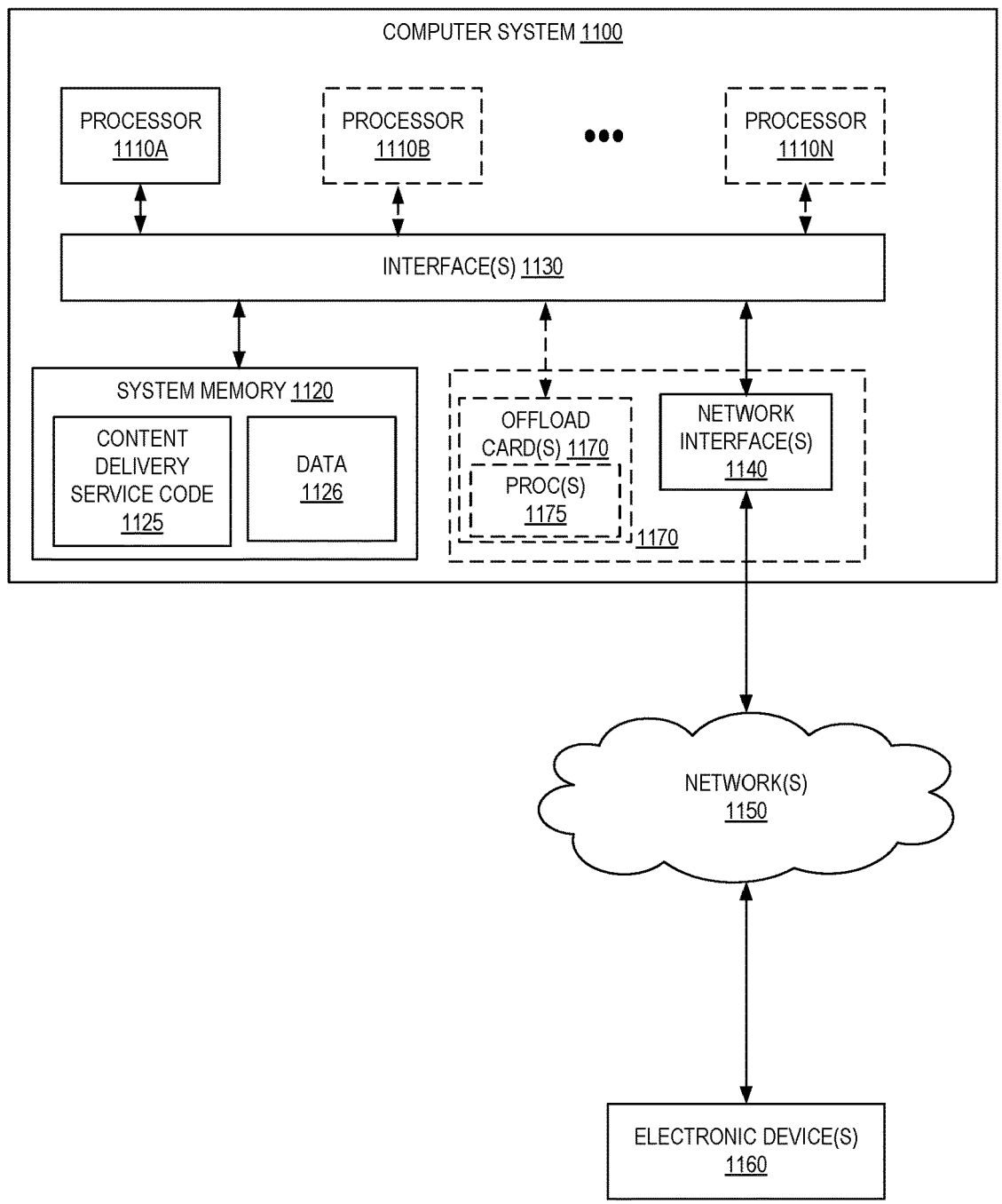
FIG. 11 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as content delivery service code 1125 (e.g., executable to implement, in whole or in part, the content delivery service 524) and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
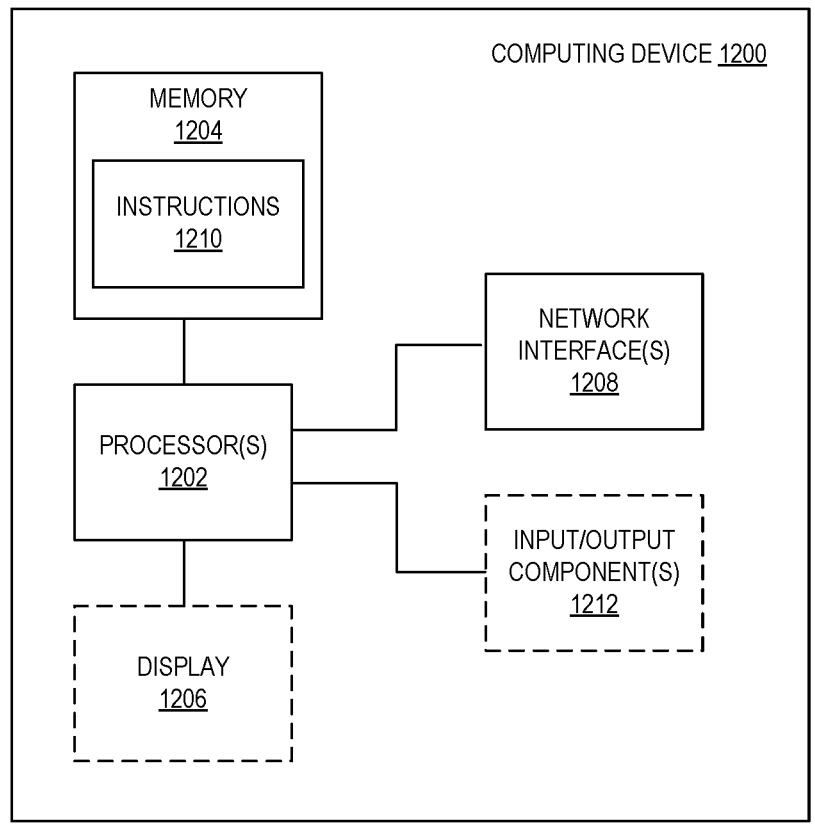
FIG. 12 illustrates a logical arrangement of a set of general components of an exemplary computing device that can be utilized in accordance with various embodiments.

FIG. 12 illustrates a logical arrangement of a set of general components of an example computing device 1200. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (for example, instructions 1210, e.g., which implement a content delivery service as disclosed herein), and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1210) for execution on the set of one or more processors 1202 of that electronic device. One or more parts of various embodiments may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some embodiments include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 13:
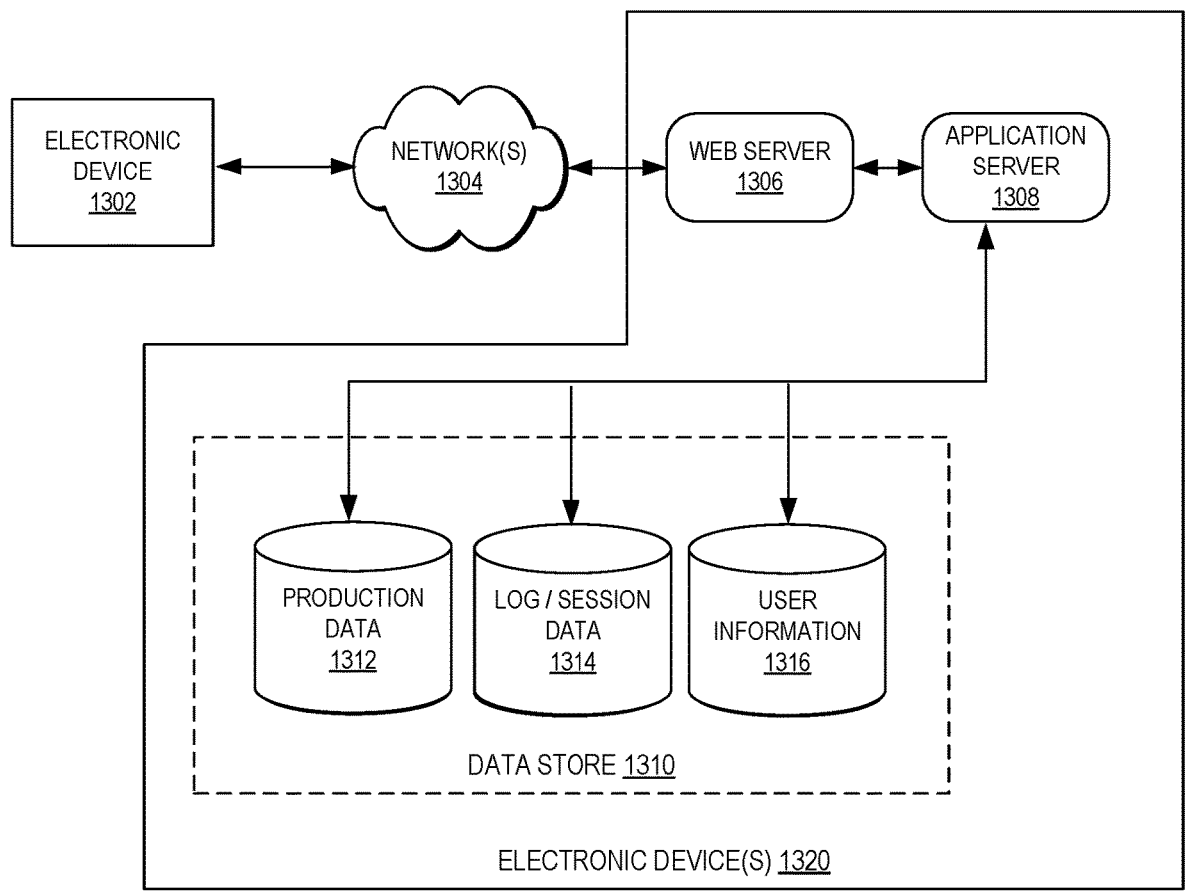
FIG. 13 illustrates an example of an environment for implementing aspects in accordance with various embodiments.

As discussed, different approaches can be implemented in various environments in accordance with the described embodiments. For example, FIG. 13 illustrates an example of an environment 1300 for implementing aspects in accordance with various embodiments. For example, in some embodiments messages are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various embodiments. The system includes an electronic client device 1302, which may also be referred to as a client device and can be any appropriate device operable to send and receive requests, messages or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations, and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    setting a content delivery service to an automatic video encoder configuration mode;
    determining statistics for a plurality of frames of a live video;
    generating each of a plurality of encoder settings, including a group of pictures (GOP) size, a number of bidirectional predicted picture frames, and a spatial adaptive quantization value, by a corresponding machine learning model of a plurality of machine learning models for an input comprising the statistics;
    receiving a value from a rate controller of the content delivery service;
    selecting one or more of the plurality of encoder settings based on the value from the rate controller;
    encoding the live video at the selected one or more of the plurality of encoder settings; and
    transmitting the encoded live video to a viewer device.

2. The computer-implemented method of claim 1, further comprising:
    displaying, via a graphical user interface to a user of the content delivery service, a query to enter the automatic video encoder configuration mode;
    receiving an indication from the user via the graphical user interface to enter the automatic video encoder configuration mode; and
    the setting of the content delivery service to the automatic video encoder configuration mode is in response to the indication.

3. The computer-implemented method of claim 1, wherein the encoding the live video at the selected one or more of the plurality of encoder settings is a single encoding of the live video between receipt of the live video at the content delivery service and the transmitting the encoded live video.

4. The computer-implemented method of claim 3, wherein the single encoding is a single-pass encoding.

5. The computer-implemented method of claim 1, wherein the statistics for the plurality of frames of the live video comprise individual statistics for each block of a plurality of blocks of each frame of the plurality of frames.

6. The computer-implemented method of claim 1, wherein the generating each of the plurality of encoder settings comprises dynamically generating the plurality of encoder settings on a per scene granularity.

7. The computer-implemented method of claim 1, wherein the generating each of the plurality of encoder settings comprises dynamically generating the plurality of encoder settings on a per group of pictures granularity.

8. The computer-implemented method of claim 1, wherein the generating each of the plurality of encoder settings comprises dynamically generating the plurality of encoder settings on a per frame granularity.

9. The computer-implemented method of claim 1, wherein the plurality of encoder settings comprises a temporal adaptive quantization value.

10. The computer-implemented method of claim 1, further comprising generating one or more of the statistics for the plurality of frames of the live video with a scene change detector of the content delivery service.

11. The computer-implemented method of claim 1, further comprising generating one or more of the statistics for the plurality of frames of the live video with a motion estimator of the content delivery service.

12. A system comprising:
a video intake service implemented by a one or more electronic devices, the video intake service including instructions that upon execution cause the one or more electronic devices to intake a live video; and
a content delivery service implemented by a one or more electronic devices, the content delivery service including instructions that upon execution cause the one or more electronic devices to perform operations comprising:
setting the content delivery service to an automatic video encoder configuration mode,
determining statistics for a plurality of frames of the live video,
generating each of a plurality of encoder settings, including a group of pictures (GOP) size, a number of bidirectional predicted picture frames, and a spatial adaptive quantization value, by a corresponding machine learning model of a plurality of machine learning models for an input comprising the statistics,
receiving a value from a rate controller,
selecting one or more of the plurality of encoder settings based on the value from the rate controller,
encoding the live video at the selected one or more of the plurality of encoder settings, and
transmitting the encoded live video to a viewer device.

13. The system of claim 12, wherein the instructions upon execution cause the content delivery service to perform operations further comprising:
displaying, via a graphical user interface to a user of the content delivery service, a query to enter the automatic video encoder configuration mode;
receiving an indication from the user via the graphical user interface to enter the automatic video encoder configuration mode; and
the setting of the content delivery service to the automatic video encoder configuration mode is in response to the indication.

14. The system of claim 12, wherein the instructions upon execution cause the content delivery service to perform operations wherein the encoding the live video at the selected one or more of the plurality of encoder settings is a single encoding of the live video between receipt of the live video at the content delivery service and the transmitting the encoded live video.

15. The system of claim 12, wherein the instructions upon execution cause the content delivery service to perform operations wherein the generating each of the plurality of encoder settings comprises dynamically generating the plurality of encoder settings on a per scene granularity.

16. The system of claim 12, wherein the instructions upon execution cause the content delivery service to perform operations wherein the generating each of the plurality of encoder settings comprises dynamically generating the plurality of encoder settings on a per group of pictures granularity.

17. The system of claim 12, wherein the instructions upon execution cause the content delivery service to perform operations wherein the generating each of the plurality of encoder settings comprises dynamically generating the plurality of encoder settings on a per frame granularity.

* * * * *